June 9, 1925.

C. H. TILLMANNS

TEA-GATHERING

Filed Jan. 13, 1925

Inventor
Carl Heinz Tillmanns,

By Emil Bønnelycke
Attorney

June 9, 1925.

C. H. TILLMANNS

TEA GATHERING

Filed Jan. 13, 1925

Inventor
Carl Heinz Tillmanns,

By Emil Bonnelycke
Attorney

Patented June 9, 1925.

1,541,446

UNITED STATES PATENT OFFICE.

CARL-HEINZ TILLMANNS, OF BANDOENG, JAVA, DUTCH EAST INDIES, ASSIGNOR OF ONE-THIRD TO CORNELIS JOHANNES ROETERS van LENNEP, OF BANDOENG, DUTCH EAST INDIES.

TEA GATHERING.

Application filed January 13, 1925. Serial No. 2,236.

*To all whom it may concern:*

Be it known that I, CARL-HEINZ TILLMANNS, a subject of the German Republic, residing at Bandoeng, Java, Dutch East Indies, have invented certain new and useful Improvements in Tea Gathering, of which the following is a specification.

This invention relates to improvements in tea gathering.

The gathering of tea has herefore been effected solely by hand. Usually four leaves, including the pekoe-leaf, inclusive are gathered while a fly leaf is left on the shrub as well as a full grown leaf. Two joints, together with a leaf, are thus taken away by the pickers, the first of which joints appears in the subsequent treatment for obtaining dry tea. Stalks are removed by special sorters, as much as possible by hand, in order to make the final product readily marketable. This sorting takes place after the crude tea has been cut many times so that the above mentioned joints are cut into several smaller pieces whereby the removal thereof is impeded.

The present invention has for its object to collect these stalks during the gathering. It is customary to use both hands in gathering and the gathered shoots are gradually assembled in bundles in the hands of the pickers in such a manner that all of the stalks project to one side. When sufficiently large handfuls are obtained, then both bundles are collected in one hand (the stalks again projecting all to one side) and the joined bundles are then thrown in a bag carried by the picker at the right or left side.

According to the invention the tea gathered and assembled in bundles, with the stalks projecting to one side, is freed from the stalks immediately after the gathering and before being thrown into the collecting bag, while the stalks, if desired, may be collected separately. This method of gathering can be carried out in all tea-cultivating countries. The invention relates primarily to an implement for carrying the method into effect.

This implement comprises a metal or other holder provided with a knife for cutting the stalks and which may carry a bag or other suitable member for collecting the cut off stalks.

Before the bundle of gathered leaves is thrown into the tea bag, it is pressed by hand over the knife, whereby the stalks projecting to one side are cut off and separated from the leaves.

The implement may be constructed in such a manner that the holder comprises two opposite walls, one of which forms the knife or is provided therewith, while between the said walls a plate or strip is arranged adapted to be adjusted towards and away from the said wall, which plate is practically parallel to the knife and can be fixed in the adjusted position. Thus by adjusting the plate or strip the length of the stalks to be cut may be regulated.

In another embodiment according to the invention the plate or strip may be omitted and the holder may then be provided with two opposite practically parallel walls one of which forms or is provided with a knife, which walls are adjustable with respect to each other and adapted to be locked in position for determining the length of the stalks to be cut off. The cut off stalk ends fall into the bag secured to the implement and the fourth leaf thus freed as well as the three other leaves are thrown without stalks into the usual gathering bag. Thus the gathering itself remains absolutely the same, whereas the above described intermediate operation requires but very little time.

According to the invention means may further be provided for preventing the hand of the operator from being injured by the knife. To this end the knife or the knife carrying plate may be provided with ribs or other enlargements in such a manner that the cutting edges, during the cutting operation, cannot come into contact with the hand. Another solution consists in arranging at the operative side of the knife or knife plate a protecting plate provided with one or more apertures or recesses for receiving the stalk ends, which plate is moreover movable in such a manner that when the implement is not in use it covers the cutting edges of the knife, and when the stalks are to be cut it can be moved by means of the stalks, held in the hand and introduced in the aperture or recess of the plate into a position in which the cutting edges are exposed and can perform their cutting function. The construction is preferably such that the protecting plate always returns automatically into the initial position. To this end it may for instance be rotatably connected to the knife plate or the knife, the axis of rotation being then located above the centre of gravity.

The above mentioned and other features of the invention will be more fully described with reference to the accompanying drawings.

The advantages of the invention are the following:

A superior product of higher value is obtained than that obtained by the ordinary treatment; the sorting costs are considerably reduced, while the degree of withering is considerably decreased by reason of the absence of the stalks.

Further in the rolling of the withered leaf, the pekoe leaf is less crushed also by reason of the absence of the stalks and consequently more tip is obtained.

Moreover in the case of temporary lack of pickers the growing too old of the gathered tea will not endanger the quality of the final product as happens often with the old method.

The invention is illustrated in the accompanying drawings by way of example.

Figure 1:
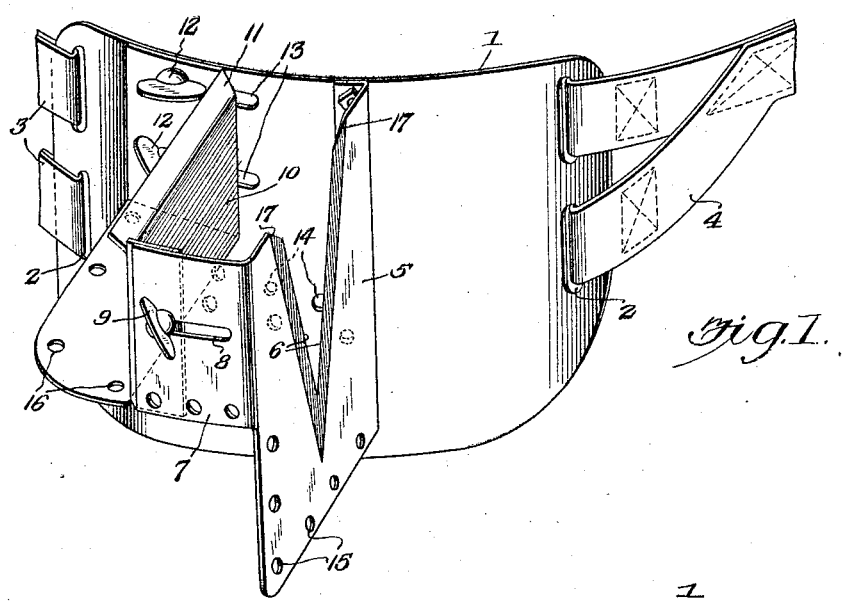
Fig. 1 shows an implement according to the invention in perspective, the collecting bag being omitted for the sake of clearness.

The implement according to Figure 1 comprises a carrier plate 1 which is somewhat curved to fit against the body of the picker. This plate may be provided at the inner side with a soft covering and has four slots 2 in which two bands 3, 4 of suitable length are secured, these bands serving for the attachment of the plate to the body.

To the carrier plate 1 a steel knife plate 5 is secured in an interchangeable manner, the said plate 5 having a V-shaped cutting edge 6 for cutting off the stalks and being provided with a bent front portion or wall 7 having a slot 8 for receiving the nut of a screw 9. By means of this screw the portion 7 may be connected to an adjustable side plate or wall 10 having an inclined upper edge 11 and being adapted to be adjusted parallel to itself towards the knife plate 5 and away therefrom and to be locked in position. This is effected by means of the screw 9 and two screws 12, each of the latter screws co-operating with a guiding nut shiftable in a slot 13 in the plate 1. The inclined edge 11 serves for guiding the tea stalks prior to the cutting off.

Instead of the attaching means described, other means could be used without departing from the spirit of invention.

The carrier plate 1 has holes 14, the knife plate has holes 15 and the back wall or portion of the side plate 10 has holes 16 for attachment of a bag for collecting the stalks. This bag has not been shown, but it is open at the bottom and during use it is tied up; and before emptying the bag it is untied so that it always remains connected to the cutting device. For safeguarding against wounding the hand the cutting edges 6 of the knife plate are rounded at 17.

Moreover, for the same purpose, the cutting edges are formed at the inner side of the plate 5 by beveling the two legs of the V-shaped recess.

Figure 2:
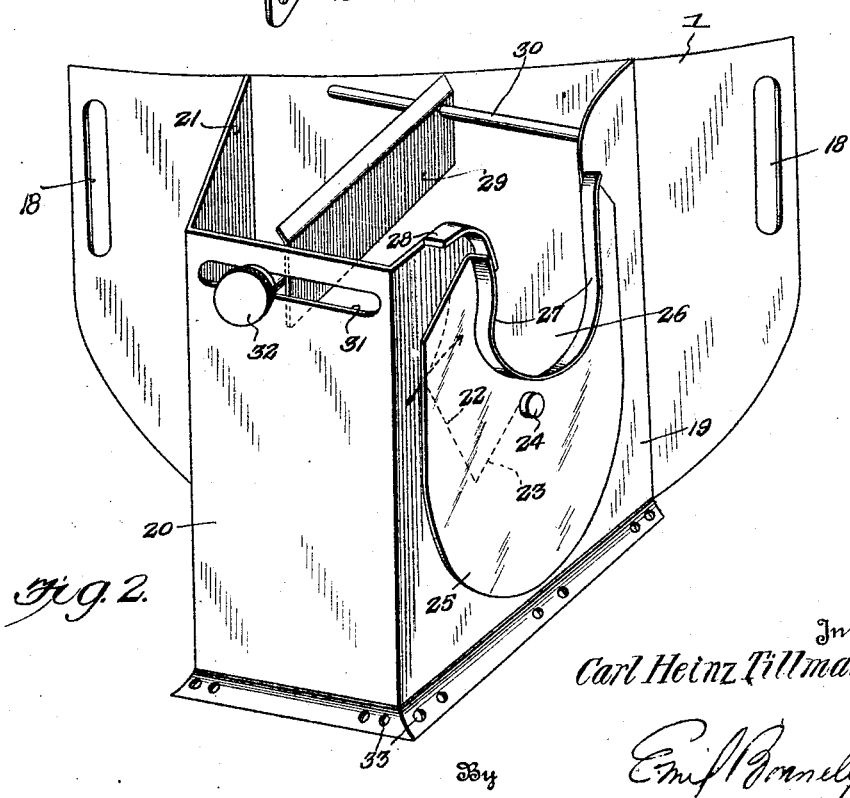
Fig. 2 shows a second embodiment in perspective.

In the construction according to Fig. 2 the carrier plate 1 is curved as before, and is provided at each end with a slot 18 for the attaching bands.

To the plate 1 an open-bottomed casing is secured, having walls 19, 20 and 21. The wall 19 forming the knife makes an angle of about 45° with the plate 1 and is provided with a U-shaped opening and also with a recess of the shape shown by dotted lines, which recess forms a knife having cutting edges 22 and 23. It will be clear that the edges 22 and 23 may form one single knife as well as two separate knives and that therefore in general a single knife or a knife composed of a plurality of portions may be used, which also applies to the construction according to Fig. 1.

To the plate 19 a protecting plate 25 is pivotally connected by means of a pin 24. This plate, like the wall 19, is provided with a U-shaped opening 26 directed upwardly in the position shown in Figure 2. The plate 25 is further provided with an outwardly projecting flange 27 following the contour of the aperture 26, the said flange forming a support for the bundle of stalks and at the same time protecting the hand during the cutting operation, as it prevents the hand from coming into contact with the knife edges 22, 23. If a bundle of stalks is laid upon the flange 27 within the U-shaped aperture and then the bundle is pressed by hand towards the knife, whereby the protecting plate 25 is moved about the pin 24 as a center, the cutting is effected. By locating the pin 24 above the centre of gravity of the protecting plate, or by using springs or similar means, it is possible to have the protecting plate return after each cutting operation into the initial position shown in Fig. 2. This initial position is further determined by the fact that the upstanding U-shaped protecting flange 27 of the protecting plate 25 comes to bear with its left end (in Fig. 2) against the lower end of a corresponding bent edge 28 formed on the wall 19.

In this embodiment a plate or strip 29 is arranged between the walls 19 and 21, one end of the said strip being slidable along a guide rod 30 secured at its ends to the wall 19 and the plate 1, while the other end of the strip passes through a slot 31 in the wall 20. This latter end is threaded and is provided with a clamping nut 32 for locking the plate 29 in the adjusted position, determining the length of the stalks to be cut.

The holes 33 in the walls 19, 20 and 21 serve for the attachment of a bag for the stalks.

Figure 3:
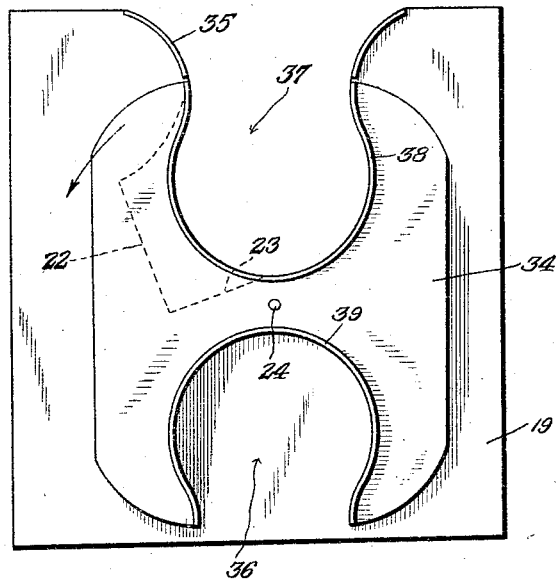
Fig. 3 shows the knife plate of the second embodiment provided with a modified protecting plate.

In Fig. 3 a protecting plate 34 is shown, mounted for rotation about the pin 24 secured to the wall 19, which wall is provided with the knife edges 22 and 23 and with a U-shaped recess. In this construction however, the upstanding edge or flange 35 of the wall 19 does not form an abutment. The protecting plate has two diametrically opposite U-shaped recesses 36 and 37 each provided with a protecting flange 39 and 38 respectively, which come into action successively after a cutting operation. It goes without saying that the protecting plate may have more than two recesses. These recesses may be arranged in such a manner that each time that a cutting operation is finished, the next recess reaches the position shown in Fig. 3 and congruous with the uppermost recess 37. A weight or spring attachment is not necessary for such a plate. The knife or knives are preferably arranged in such a manner that the bundle, before the cutting operation begins, is somewhat compressed.

Figure 4:
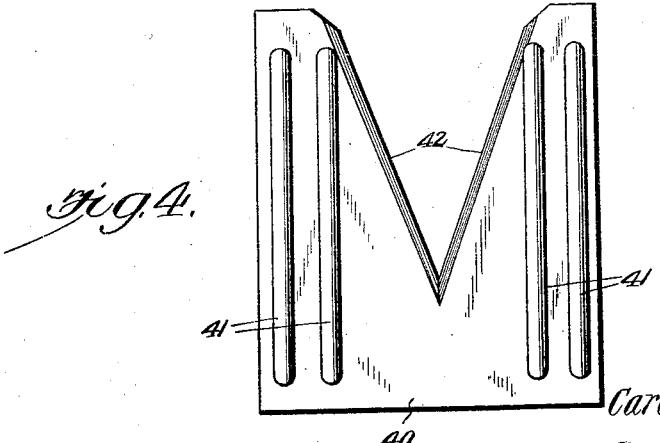
Fig. 4 shows a knife plate belonging to the construction according to Fig. 1 and having upstanding protecting ribs.

In the construction according to Fig. 4, the plate or wall 40 corresponding to the plate 5 in Fig. 1, is provided with upstanding ribs 41 for preventing the hand of the picker from being injured by the knife edges 42. Instead of ribs, other enlargements or the like may be used.

Having now particularly described and ascertained the nature of my said invention and the manner in which it is to be performed, what I claim as new and desire to secure by Letters Patent is:

1. A tea-gathering implement, comprising a carrier plate having means for enabling its attachment to the body of the user; and a knife plate secured to the carrier plate for severing the stalks of the gathered bundles of tea plants held in the hands of the user.

2. A tea-gathering implement, comprising a carrier plate having means for enabling its attachment to the body of the user; and an open-topped casing secured to said plate and embodying spaced, opposite side walls, one of which is formed with a recess having a sharpened edge.

3. A tea-gathering implement, comprising a carrier plate; an open-topped casing carried thereby and embodying spaced, opposite side walls, one of which is formed with a recess having a sharpened edge for cutting the stalks of the gathered tea plants; and a guide for the stalks, said guide and the recessed side wall constituting companion parts, one of which is movable toward or away from the other to regulate the length of the stalks to be cut.

4. A tea-gathering implement, comprising a carrier plate; an open-topped casing carried thereby and embodying spaced, opposite side walls, one of which is formed with a recess providing two sharpened edges arranged at an angle to each other for cutting the stalks of the gathered tea plants; and a guide for the stalks movable toward and away from the recessed side wall to regulate the length of the stalks to be cut.

5. A tea-gathering implement, comprising a carrier plate having means for enabling its attachment to the body of the user, a stalk-cutting knife fixed to said plate; and a movable stalk guide carried by said plate for adjustment toward and away from the knife to regulate the length of the stalks to be cut.

6. A tea-gathering implement, comprising a carrier plate having means for enabling its attachment to the body of the user; a vertical knife plate fixed to the carrier plate and formed with a recess having a pair of sharpened cutting edges disposed at an angle to each other; and a movable stalk guide secured to said carrier plate in substantial parallel relation to the knife plate for adjustment toward or away from the latter plate to regulate the length of the stalks to be cut.

7. A tea-gathering implement, comprising a carrier plate having means for enabling its attachment to the body of the user; and a knife plate fixed to the carrier plate in vertical position to sever the stalks of the gathered bundles of tea plants held in the hands of the user, said knife plate being formed with a recess having a pair of angularly-disposed cutting edges.

8. A tea-gathering implement, comprising a carrier plate formed with slots for the reception of fastening straps to attach it to the body of the user; and a knife plate fixed vertically to the carrier plate for severing the stalks of the gathered bundles of tea plants held in the hands of the user.

9. A tea-gathering implement, comprising a carrier plate having means for enabling its attachment to the body of the user; and a vertical casing carried by said plate and embodying spaced side walls, one of which is formed with a recess having a sharpened edge; said casing being open at opposite ends and provided adjacent its lower end with means for enabling the suspension of at least one collecting bag therefrom.

In testimony whereof I affix my signature.

CARL-HEINZ TILLMANNS.